United States Patent
Gupta et al.

(10) Patent No.: US 8,862,748 B2
(45) Date of Patent: Oct. 14, 2014

(54) METHOD AND SYSTEM FOR OPTIMIZING POWER CONSUMPTION AND REDUCING MIPS REQUIREMENTS FOR WIRELESS COMMUNICATION

(75) Inventors: Naresh Kumar Gupta, Delhi (IN); Rajat Maheshwari, Indore (IN); Vincent Charlier, Auderghem (BE); Gerrit Vermeire, Lochristi (BE)

(73) Assignee: ST-Ericsson SA, Plan-les-Ouates (CH)

( * ) Notice: Subject to any disclaimer, the term of this patent is extended or adjusted under 35 U.S.C. 154(b) by 998 days.

(21) Appl. No.: 12/058,125

(22) Filed: Mar. 28, 2008

(65) Prior Publication Data

US 2008/0270622 A1 Oct. 30, 2008

(30) Foreign Application Priority Data

Mar. 30, 2007 (IN) .............................. 723/DEL/2007

(51) Int. Cl.
*G06F 15/16* (2006.01)
*H04L 29/08* (2006.01)
*H04L 29/06* (2006.01)
*H04W 52/02* (2009.01)
*H04W 76/02* (2009.01)

(52) U.S. Cl.
CPC ................. *H04L 69/32* (2013.01); *H04L 69/12* (2013.01); *H04W 52/0258* (2013.01); *Y02B 60/50* (2013.01); *H04W 76/02* (2013.01)
USPC ............................ 709/227; 709/230; 709/238

(58) Field of Classification Search
CPC ......... H04L 69/14; H04L 69/16; H04L 69/32; H04L 45/00; H04W 76/02
USPC .................................. 709/227, 230, 238, 250
See application file for complete search history.

(56) References Cited

U.S. PATENT DOCUMENTS

| | | | |
|---|---|---|---|
| 2003/0012156 A1 | 1/2003 | Fukuda | |
| 2004/0010545 A1* | 1/2004 | Pandya | 709/203 |
| 2005/0086349 A1* | 4/2005 | Subramaniyan | 709/230 |
| 2005/0135417 A1* | 6/2005 | Fan et al. | 370/469 |
| 2006/0174032 A1* | 8/2006 | Winchester et al. | 709/238 |
| 2007/0030861 A1* | 2/2007 | Johnson et al. | 370/469 |
| 2007/0288645 A1* | 12/2007 | Kass | 709/230 |
| 2008/0155051 A1* | 6/2008 | Moshayedi | 709/213 |
| 2010/0057941 A1* | 3/2010 | Fan et al. | 709/250 |

FOREIGN PATENT DOCUMENTS

| | | |
|---|---|---|
| CN | 1366756 A | 8/2002 |
| CN | 1925469 A | 3/2007 |

OTHER PUBLICATIONS

Real Time Streaming Protocol (RSTP) published on Feb. 2, 1998 by Schulzrine et al. in Collaboration with Columbia U, Netscape/Real Networks. Expiration date Aug. 2, 1998.*

* cited by examiner

*Primary Examiner* — Frantz Jean
(74) *Attorney, Agent, or Firm* — Coats & Bennett, PLLC

(57) ABSTRACT

A system for reducing system latency, MIPS requirements, and power consumption in a wireless communications system includes part of an upper layer stack processing being performed on a controller to relieve a host processor of some data intensive operations. After the initial connection establishment phase in which the controller may retrieve certain information required for data transmission and stores the same locally, the data source may provide data to the controller, such as, without routing the data through the host. The host may be relieved of the data processing that needs to be done while the data is being transferred.

17 Claims, 10 Drawing Sheets

METHOD AND SYSTEM FOR OPTIMIZING POWER CONSUMPTION AND REDUCING MIPS REQUIREMENTS FOR WIRELESS COMMUNICATION

Field of the Invention

The present invention relates to the field of wireless communications and, specifically to a system and a methodology for enhancing performance during wireless communications by reducing system latency, MIPS requirements and power consumption.

BACKGROUND OF THE INVENTION

Communications over wireless networks are increasing day by day as wireless communications permit users to communicate with great convenience. In a conventional wireless implementation, two devices, a local device and a remote device, establish a wireless link and exchange data on that link.

FIG. 1 illustrates a block diagram of a conventional wireless implementation. The system includes a local device, and one or more remote devices. The local device includes a host 102, a host controller 104, a data source 106, a data source host interface (DSHI) 108 and a host controller interface (HCI) 110. In some implementations it is possible that the data source 106 is included within the host 102. The data source host interface (DSHI) 108 specifies an interface between the host 102 or the host controller 104 and the data source 106. The HCI 110 specifies an interface between the host 102 and the host controller 104. The host controller interface (HCI) 110 can be a UART (universal asynchronous receiver transmitter), a USB (universal serial bus), PCMCIA (peripheral component micro-channel interconnect architecture), an SDIO (secure digital input output), a SPI (Serial Peripheral Interface) and the like. The host 102 includes an application 112 and an upper layer stack 114. The application 112 provides the user interface to a user. The application 112 on the host searches for other devices in the Wireless neighborhood. The application 112 searches for services present on these devices through a Service Discovery Protocol (SDP) for selecting the appropriate device to which connection is to be established. The host controller 104 includes a lower layer stack 116. A data source host interface (DSHI) 126 specifies an interface between a host 118 or a host controller 120 and a data sink 122. The data source host interface (DSHI) 126 can be a PCM (pulse code modulation) signal, an I2C bus (inter integrated circuit bus) and the like. A HCI 126 specifies an interface between the host 118 and the host controller 120. The host 118 includes an application 128 and an upper layer stack 130. The host controller 120 includes a lower layer stack 132.

The host 102 and the host 118 run the upper layer stack 114, 130 of the wireless protocol. In an embodiment, the host 102 includes an application in a mobile communication network environment. The host controller, such as 104 and 120 generally performs low level operations in wireless connectivity like link management, media access control, and the likes. The data source 106 is a device which provides data that will be transferred using various wireless protocols.

In a conventional method, data transmission using a wireless link involves a connection establishment, then a data streaming and then a disconnection of the data streaming. FIG. 2 illustrates a block diagram of the connection establishment between a local device and a remote device. The application 112 searches for other devices in the wireless neighborhood. The application 112 searches for services present on the other devices through a service discovery protocol (SDP) to select an appropriate device to which connection can be established. The application 112 selects a remote wireless device and requests the upper layer stack 114 to create a connection with the remote device. The upper layer stack 114 in turn informs the lower layer stack 116, and the host controller 104 to create a link layer connection 202. Different layers of the upper layer stack 114 make an upper layer connection 204 to the corresponding layers on the remote device 118. Various parameters, like, quality of service, packet rate, etc., are negotiated between the remote device and the local device during the connection establishment phase.

FIG. 3 illustrates a block diagram describing a data streaming process in a conventional technique. The upper layer stack 114 gets data from the data source 106. The upper layer stack 114 performs few operations (such as encoding and the like) on the data. The upper layer stack 114 applies headers to the data for various protocol stack layers that are being used to encapsulate the data. The upper layer stack 114 then transmits a message to the lower layer stack 116 on the host controller 104. The lower layer stack 116 transmits the message through a wireless link layer 202 to the remote device. The above steps are repeated till the application 112, 128 receives an instruction to stop the data streaming.

FIG. 4 illustrates a block diagram describing a data streaming disconnection in a conventional architecture. The upper layer stack 114 disables the upper layer connection 204 between the local device and the remote device. The upper layer stack 114 requests the lower layer stack 116 to disconnect the remote device and then the lower layer stack 116 removes the link layer connection 202.

The conventional techniques utilize three phases for data transmission, such as connection establishment, data streaming and disconnection of the data streaming and in all these phases the host 102 actively acts. In the conventional techniques, system latency is increased due to increased computational cycle (MIPS, Million Instructions Per Second) and the processor is always in active mode to execute the above three phases. Therefore the conventional techniques increase the system latency and also lead to large power consumption and MIPS (Million Instructions Per Second) as these techniques are unable to bypass the processor and the processor is always in active mode to execute the above three phases.

Therefore there is need of an architecture and methodology to enhance performance during wireless communications by reducing system latency and the power consumption.

SUMMARY OF THE INVENTION

An embodiment provides an architecture and methodology which reduces system latency and power consumption during wireless communications.

Another embodiment provides a system which reduces synchronization lag (time lag between a video signal and an audio signal for better signal reception).

Yet another embodiment provides a system that supports the data transmission and the data reception for the half duplex and the full duplex transmission.

To achieve the aforementioned embodiment, an embodiment provides a method for configuring a connection for direct data streaming between a local device and a remote device that may include establishing a connection between an upper layer stack of the local device and an upper layer stack of the remote device sending a proprietary message; and starting the direct data streaming between the local device and the remote device.

A further embodiment may provide a system for configuring a connection for direct data streaming comprising a local device, the local device establishing a connection between an upper layer stack of the local device and an upper layer stack of a remote device and said remote device, the remote device establishing the connection between upper layer stack of the local device and upper layer stack of the remote device.

A further embodiment may provide a computer program product utilizing a method configuring connection for direct data streaming between a local device and a remote device, the computer program product comprising a computer readable medium configured with processor executable instructions, the computer program product comprising establishing a connection between an upper layer stack of the local device and an upper layer stack of the remote device, sending a proprietary message for starting the direct data streaming, and starting the direct data streaming between the local device and the remote device.

BRIEF DESCRIPTION OF DRAWINGS

The aforementioned aspects and other features of the present invention will be explained in the following description, taken in conjunction with the accompanying drawings, wherein.

DETAILED DESCRIPTION OF THE PREFERRED EMBODIMENTS

Figure 1:
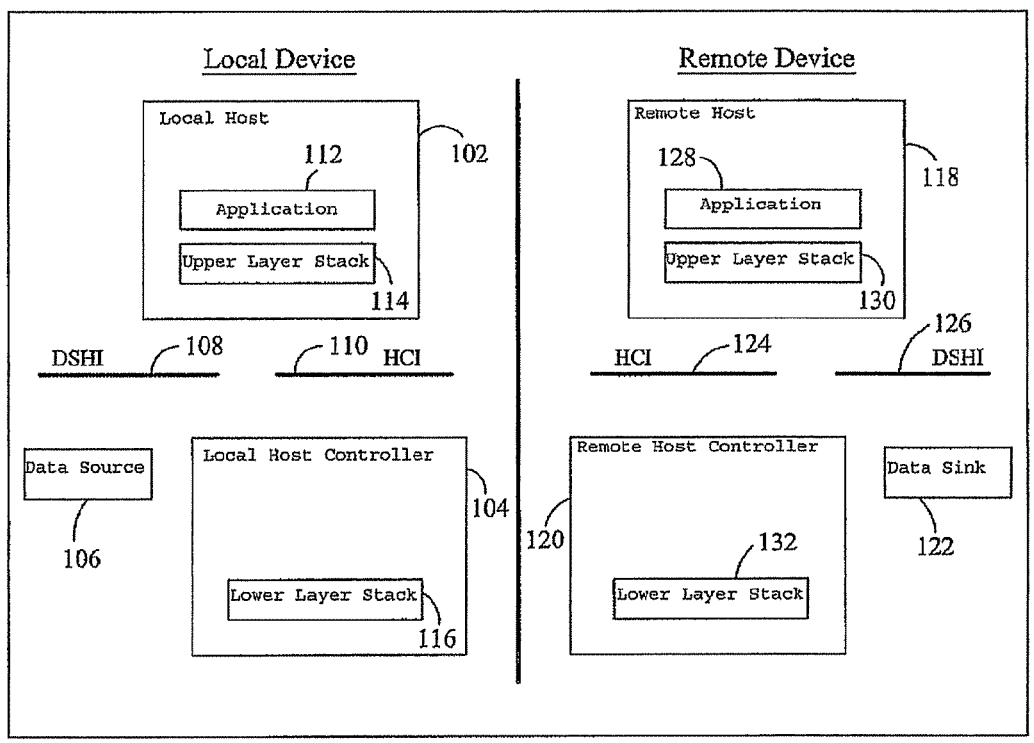
FIG. 1 illustrates a block diagram of a conventional wireless architecture as in the prior art.
Figure 2:
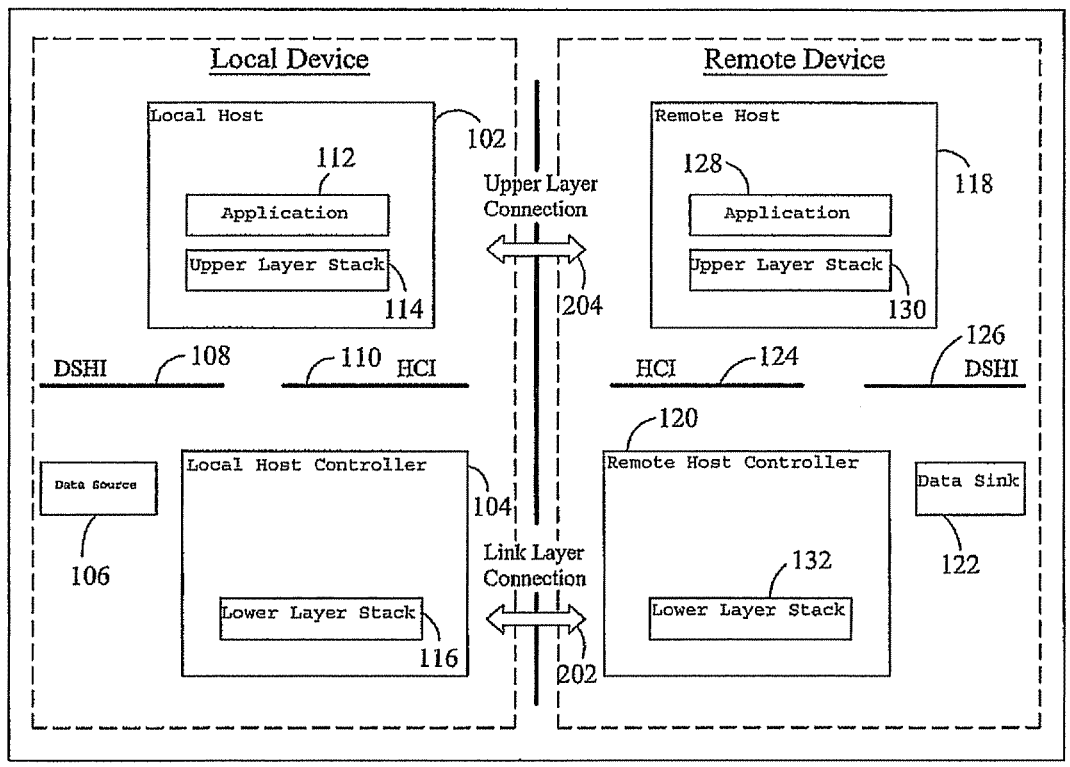
FIG. 2 represents a block diagram illustrating a connection establishment between a local device and a remote device in a conventional wireless architecture as in the prior art.
Figure 3:
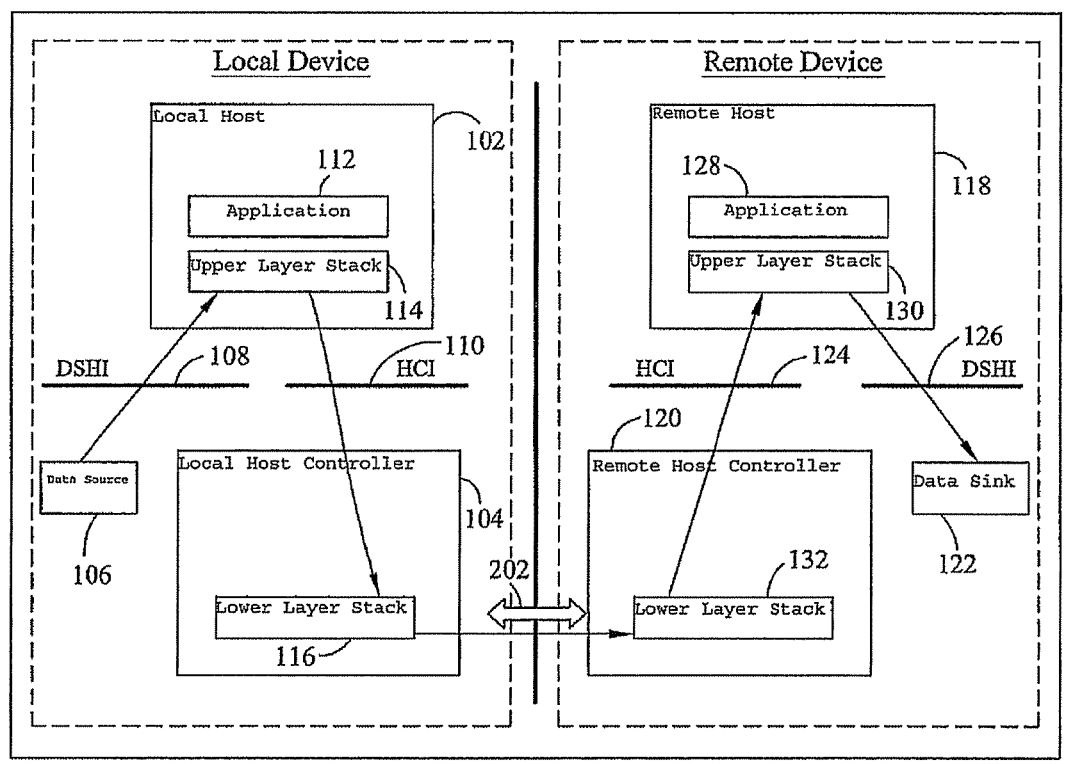
FIG. 3 illustrates a block diagram describing a data streaming process in a conventional architecture as in the prior art.
Figure 4:
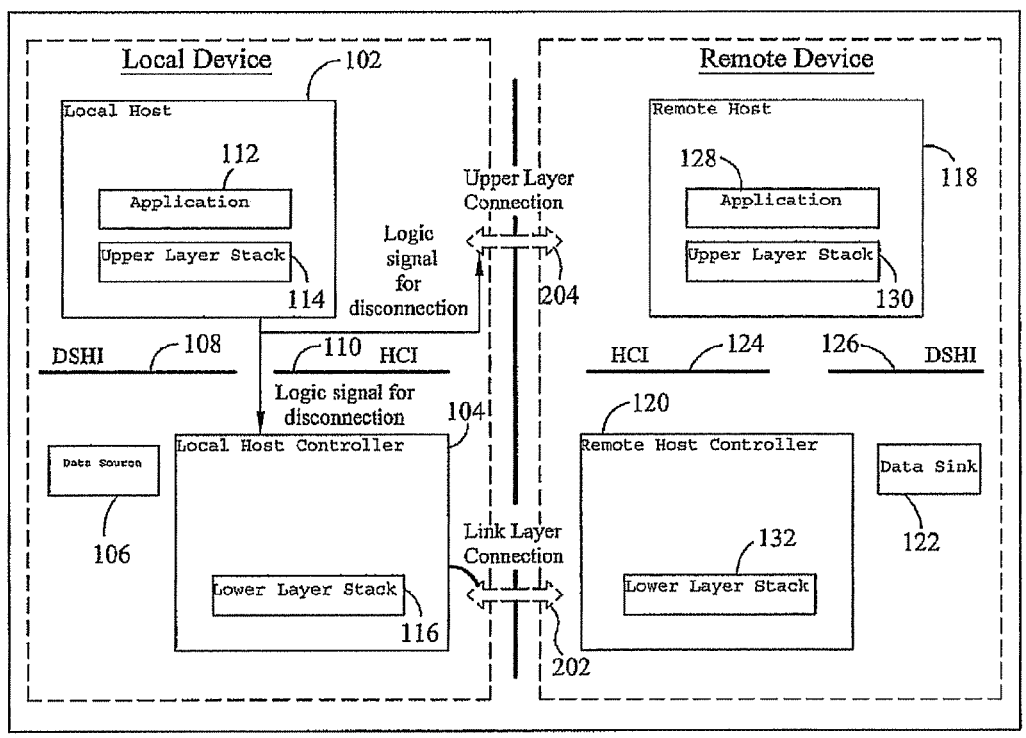
FIG. 4 illustrates a block diagram describing a data streaming disconnection in a conventional architecture as in the prior art.

The embodiments of the present invention will be described in detail with reference to the accompanying drawings. However, the present invention is not limited to the embodiments. The present invention can be modified in various forms. The embodiments of the present invention are only provided to explain more clearly the present invention to the ordinarily skilled in the art of the present invention. In the accompanying drawings, like reference numerals are used to indicate like components.

Figure 5:
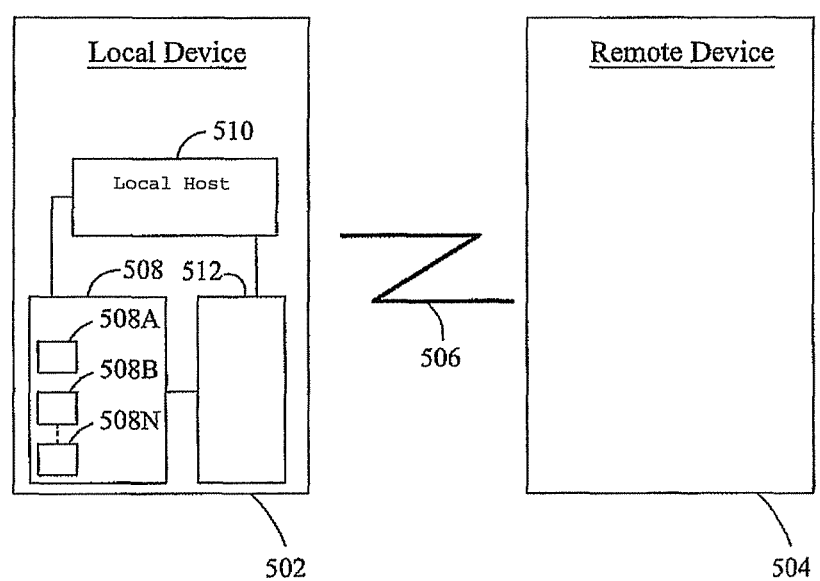
FIG. 5 discloses a system that would be used to illustrate the methodology followed for data communication between two devices in accordance with an embodiment of the present invention.

FIG. 5 discloses a system that should be used to illustrate the methodology followed for wireless data communication between two devices according to an embodiment. The system includes a local device 502, a remote device 504 and a physical link 506. The local device 502 includes a plurality of data source 508A, 508B, . . . , 508N, (hereinafter referred as 508), a host 510, and a controller 512. The controller 512 can be a wireless controller. The controller 512 will hereinafter referred as the wireless controller 512. The local device 502 establishes a connection between an upper layer stack of the local device 502 and an upper layer stack of the remote device 504. The remote device 504 establishes the connection between the upper layer stack of the local device 502 and the upper layer stack of the remote device 504.

Figure 6:
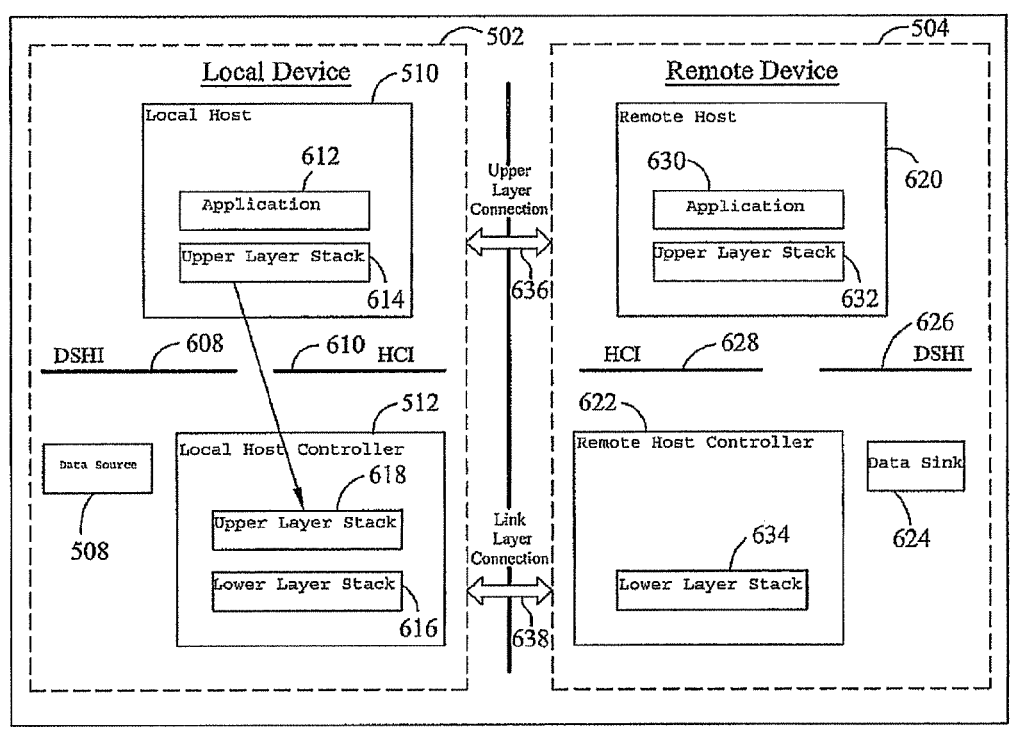
FIG. 6 illustrates a block diagram that discloses the wireless communication system according to another embodiment of the present invention.

FIG. 6 illustrates a block diagram that discloses a wireless communication system according to another embodiment. The local device 502 includes a local host 510 and a local host controller 512. The local host 510 sends a proprietary message for starting the direct data streaming. The local host controller 512 starts the direct data streaming between the local device 502 and the remote device 504. The local device 502 includes a data source 508 providing the data to be streamed between the local device 502 and the remote device 504. The data source 508 can be a source of data like video data, audio data etc. However, the most common examples of the data source 508 include a FM unit or a video/audio unit. The local host 510 includes an application 612 and an upper layer stack 614. The application 612 provides the user interface to a user. The upper layer stack 614 sends connection information to the local host controller 512.

Figure 7:
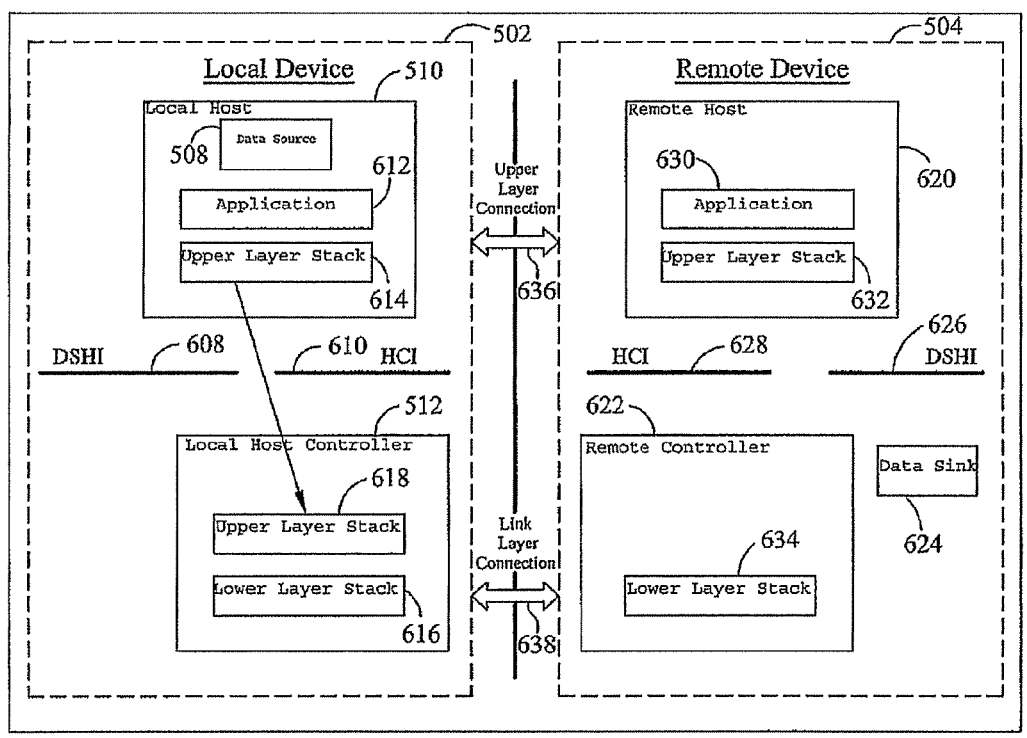
FIG. 7 illustrates a block diagram that discloses the wireless communication system according to yet another embodiment of the present invention.

The local device 502 additionally includes a data source host interface (DSHI) 608 and a host controller interface (HCI) 610 which specifies the exchange of information between different components of the system. The data source host interface (DSHI) 608 specifies the interfacing between the host 510 or the wireless controller 512 and the data source 508 for exchanging of information with each other. In one of the embodiments the data source 508 resides within the host 510 as shown in FIG. 7. The HCI 610 specifies interfacing between the host 510 and the wireless controller 512 for exchanging of information. The host 510 includes an application 612 and an upper layer stack 614. The application 612 on the host 510 searches for other devices in the wireless neighborhood. The application 612 selects the remote device 504 and requests the upper layer stack to create a connection between the local device 502 and the remote device 504.

The upper layer stack 614 is a set of computer program instructions which are executed to perform certain operations (such as encoding and encapsulation) on the data packets to prepare the data packets for wireless transmission. One of ordinary skill in the art could appreciate that for the sake of clarity the computer program instructions are said to be stored in the form of a stack in a layered approach as different layers of computer program perform different operations on the data packets. The lower layers stack 616 and the partial upper layer stack 618 are two sets of computer program instructions which run on the wireless controller 512 to perform different operations respectively on the data packets to prepare them for the streaming.

The local host controller 512 includes a partial upper layer stack 618 and a lower layer stack 616. The partial upper layer stack 618 formats the data to form data packets. The lower layer stack 616 sends the data packets directly to the remote device 504 through the physical link 506 without host intervention.

The remote device 504 includes a remote host 620, a remote host controller 622, and a remote data sink 624. The remote host 620 provides user interface for requesting data transfer. The remote host controller 622 receives the data directly streamed from the local device. The remote data sink 624 stores the received data.

The remote host 620 includes an application 630 and an upper layer stack 632. The application 630 provides the user interface to a user. The upper layer stack 632 provides data formatting capability to the remote host 620.

The remote host controller 622 includes a lower layer stack 634. The lower layer stack 634 is receiving the directly streamed data from the local device 502.

The local device 502 can be a mobile device, a personal digital assistant (PDA), a gaming device, and a laptop. The remote device 504 can be a Bluetooth headset, Bluetooth joystick, and a video game console.

For starting data communication, the local device 502 and the remote device 504 first establish a connection in a wireless communication. The connection is hereinafter referred as a physical link. The physical link can be a connection (such as the link 506) between the two devices. In the above embodiment, the local device 502 is shown as a transmitter of data and the remote device 504 is shown as a receiver of data. During the establishment of the Upper Layer connection 636, the lower layer stack 616 spies on the connection information being exchanged in upper layers 614 and 632 and stores it for later use.

In an embodiment implemented in a full-duplex system, the data is first internally processed such as encoding, header formation, error-correction coding etc. in the local device 502 and then the data is transferred from the local device 502 to the remote device 504. In the local device 502, data from the data source 508 is fed to the host 510, which performs certain operations such as protocol level header, parameters of encoding, quality of service (QoS) or any other protocol specific parameter, on the individual data packets for transmission based on the communication protocol selected for communication between the data source 508 and the processor 510. One of ordinary skill in the art would appreciate that the exact operations performed by the host stage would be dependent on the specific protocol used for data transmission. The embodiments described herein are not limited to any specific technology used for data transmission between the first device and the second device. However, the most common operations that are performed at this stage would comprise encoding, header formation, error-correction coding etc.

After performing the above operations, the host 510 sends the data packets to the wireless controller 512. The main function of the wireless controller 512 is to control the wireless exchange of data between the local device 502 and any other device which uses the same technology for data communication. One of ordinary skill in the art would appreciate that the exact architecture of the wireless controller 512 would depend on the specific wireless technology (Such as FM streaming through Bluetooth) used for data communication.

The wireless controller 512 further transmits the data packets to the remote device 504. During this process of receiving data packets from the host 510 and transmitting the same packets to the remote device 504, the wireless controller 512 retrieves certain information from the data packets and stores the same locally. In one embodiment, the information retrieved by the wireless controller 512 comprises the header information that was appended to the data packets during the initial processing of data by the processor 510.

Also the host 510 can send the command with the header information and other parameters to wireless controller 512. After a first cycle of data packets are transferred in this manner and the information corresponding to such packets is retrieved and stored locally by the wireless controller 512, the host 510 instructs the controller 512 to directly streaming the data from the data source 508 to the remote device 504. The direct steaming of data includes receiving the data from a data source. The direct steaming of data further includes formatting the data to form data packets; and sending the data packets directly to the remote device through the link 506 without the host 510 intervention. The formatting of the data to form the data packets includes encoding the data as per a protocol and encapsulating the data to form the data packets. In one alternate embodiment, instead of retrieving the above mentioned locally stored information from the first few data packets that are transferred initially, the wireless controller analyzes the connection establishment data transferred between the two devices during the initial connection establishment phase and retrieves the information from the connection establishment data.

The process is continued in this manner until the wireless controller 512 or the data source 508 receives any instruction from the host 510 to stop the direct data streaming. Therefore, in an embodiment, after the transmission of initial few packets, the wireless controller 512 receives data directly from one of the data sources 508 instead of the data getting routed through the host 510. Hence the host 510 is relieved of the data processing that would otherwise be needed during the data transfer. Hence, the overall latency of the system is improved because of the optimal routing of data traffic.

During the disconnection phase, the upper layer stack 614 sends a message to the lower layer stack 616 to stop data streaming. The lower layer stack 616 de-activates the partial upper layer stack 618. The upper layer stack 614 requests the lower layer stack 616 to disconnect the remote device and the lower layer stack 616 removes the wireless link 638.

Figure 8:
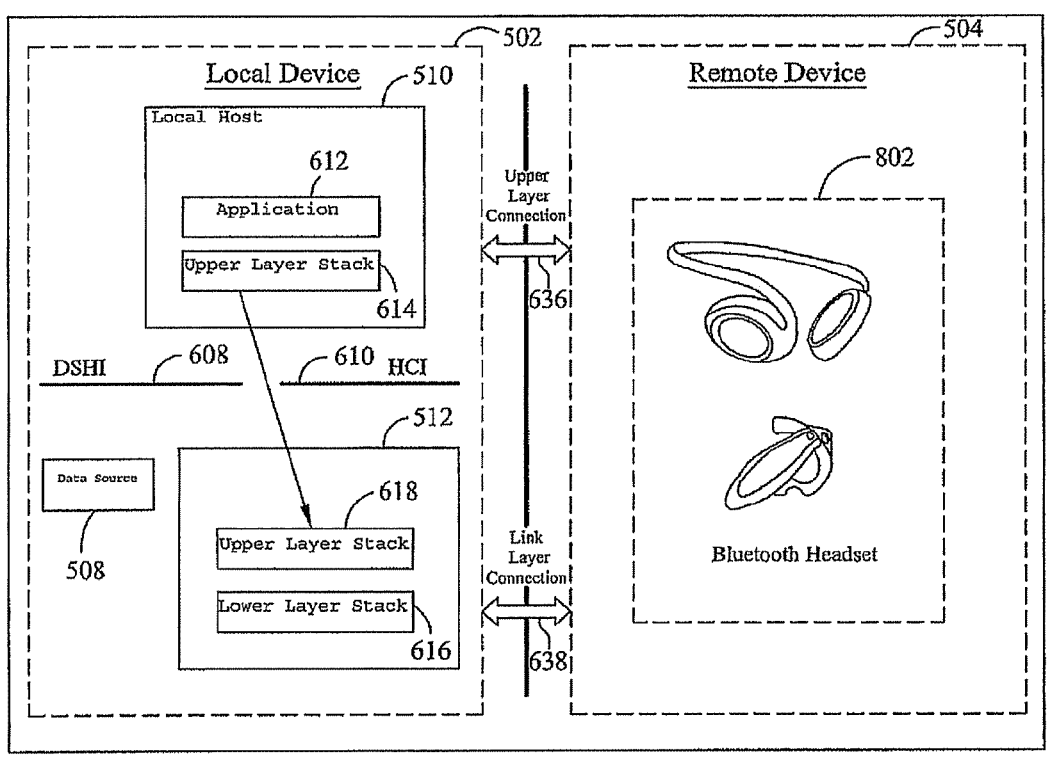
FIG. 8 illustrates a block diagram that discloses an application for the wireless communication according to an embodiment of the present invention.

FIG. 8 illustrates a block diagram that discloses an application for the wireless communication according to an embodiment. In an embodiment the remote device 504 can be a Bluetooth headset 802. FM radio data is streamed to a Bluetooth headset 802 using A2DP (Advanced Audio Distribution Profile). On receiving a proprietary message, a digital audio interface of an FM radio is connected to the wireless controller 512 by bypassing the host 510. During the connection establishment phase, a lower layer stack 616 analyses the A2DP connection information L2CAP headers (Logical Link Control and Adaptation Protocol), AVDTP (Audio/Video Distribution Transport Protocol) headers, HCI information, etc. and stores these for later use. During the data streaming phase, the upper layer stack 618 encodes digital audio data and creates an A2DP packet with the connection information stored during the connection establishment phase. The upper layer stack 618 provides the data packet to the lower layer stack 616 for transmitting to the remote device 504. In this manner the FM radio data is directly streamed to the Bluetooth headset 802 through the controller 512 by bypassing the host 510.

Figure 9:
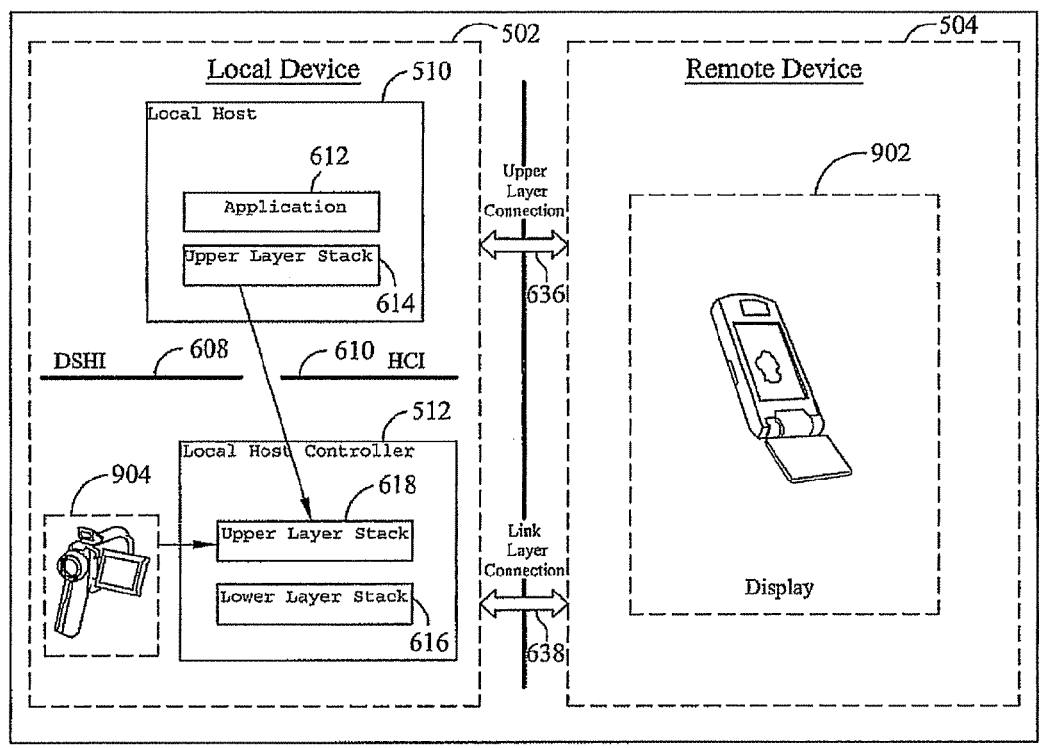
FIG. 9 illustrates a block diagram that discloses another application for the wireless communication according to another embodiment of the present invention.

FIG. 9 illustrates a block diagram that discloses another application for the wireless communication according to another embodiment. The data is streamed to a remote display 902 using video distribution profile. H.263 data is streamed to the remote display 902 using video distribution profile. A H.263 interface coming from an H.263 encoder which encodes YUV Luminance, Chrominance components samples from a camera or a video source 904 of a video. On receiving a proprietary message, the camera or a video source 904 is connected directly to the wireless controller 512 by bypassing the host 510. During connection establishment phase, the lower layer stack 616 analyses the VDP (Video Distribution Profile) connection information (L2CAP headers, AVDTP (Audio/Video Distribution Transport Protocol) headers, HCI information, etc.) and stores these for later use. During data streaming phase, the upper layer stack 618, encodes YUV data and creates a VDP packet with the connection information stored during the connection establishment phase. The upper layer stack 618 then provides the data to the lower layer stack 616 for streaming to the remote device 504.

Figure 10:
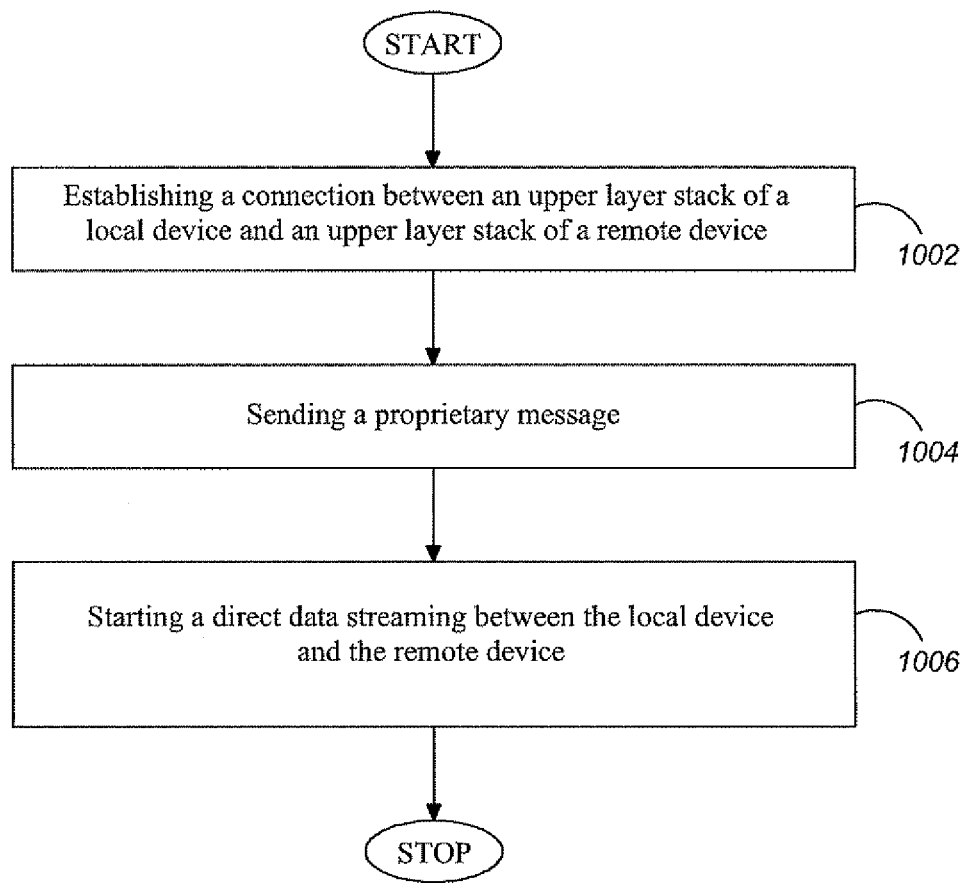
FIG. 10 illustrates a flow diagram of a method of streaming of data packets according to an embodiment of the present invention.

FIG. 10 illustrates a flow diagram of a method for streaming of data packets between a first device and a second device according to an embodiment. At step 1002, a connection between an upper layer stack of the local device and an upper layer stack of the remote device is established. At step 1004, a proprietary message is sent. At step 1006, the direct data streaming between the local device and the remote device is started.

In an embodiment, establishing the connection includes exchanging a set of connection information between the local device and the remote device and storing this set of connection information for subsequent usage.

In another embodiment, starting the direct data streaming includes receiving the data from a data source, formatting the data to form data packets, and sending the data packets directly to the remote device through a physical link without host intervention.

In yet another embodiment, formatting of the data to form the data packets includes encoding of the data as per a protocol, and encapsulating the data to form the data packets. The connection information may be a protocol information, a Quality of Service (QoS) parameter, a bit rate parameter.

In still yet another embodiment, the method further includes stopping the direct data streaming between the local device and the remote device on receiving a stop signal. The stopping of the direct data streaming may include sending a message to stop direct data streaming, which further disconnects the connection between the local device and the remote device.

It is important to note that while the embodiments have been described in the context of a fully functioning data processing system, those of ordinary skill in the art will appreciate that the processes are capable of being distributed in the form of a computer readable medium of instructions and a variety of forms and that the embodiments apply equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

There exist various utilities or applications of the embodiments described herein. For example FM radio data is streamed to a remote Bluetooth stereo headset using A2DP (advanced audio distribution profile). In another example, the music is played on the host audio codec thereby generating PCM samples. These PCM samples are transferred to the host controller through PCM/I2S interface and SBC encoding of the samples is done on the host controller. After that the data is transferred to a remote Bluetooth stereo headset using A2DP. In yet another example, data is streamed to a remote display using VDP (Video Distribution Profile). H.263 data is streamed to a remote display using VDP (Video Distribution Profile). An H.263 interface (coming from an H.263 encoder which encodes YUV (Luminance, Chrominance components) samples from a camera or a video source) of a video is connected to the wireless controller instead of the host.

The embodiments described herein offer several advantages. The present architecture proposes to perform a part of the upper layer stack processing on the wireless controller (instead of the host) to relieve the host for some data intensive operations. The host does not play an active part in the data steaming phase. The data source can provide data directly to the wireless controller without routing it through the host. The host can be allowed to go into low power modes to save power. The overall latency of the system is improved because of the optimal routing of the data traffic. The embodiments are compatible with the existing wireless implementations as no change is required to the existing wireless protocol. The embodiments are compatible with existing application software as no changes are required on the application software interface (API). The embodiments are also extendible to other wireless and wired protocols. Further the embodiments described herein support the data transmission and the data reception for the half duplex and the full duplex transmission.

Although the disclosure of architecture and method has been described in connection with the embodiments illustrated in the accompanying drawings, it is not limited thereto. It will be apparent to those skilled in the art that various substitutions, modifications and changes may be made thereto without departing from the scope and spirit of the disclosure.

That which is claimed:

1. A method for configuring a connection for direct data streaming between a local device and a remote device comprising:
   establishing a connection between an upper layer stack of the local device and an upper layer stack of the remote device by at least exchanging connection information between the local device and the remote device;
   analyzing the connection information at the local device during the exchanging, the connection information including a command and header information;
   sending a message over the established connection; and
   starting a direct data stream between the local device and the remote device over the established connection based upon receiving the message by at least
      receiving the data stream from a data source,
      formatting the data stream into data packets, and
      sending the data packets directly to the remote device through a physical link without a host intervention, and wherein the data packets are sent without host intervention based upon the command and header information analyzed by the local device during the connection establishment.

2. The method as in claim 1, wherein formatting the data stream into data packets comprises:
   encoding the data stream; and
   encapsulating the data stream to form the data packets.

3. The method as in claim 1, wherein the connection information is at least one of protocol information, a Quality of Service (QoS) parameter, and a bit rate.

4. The method as in claim 1, further comprising stopping the direct data stream between the local device and the remote device.

5. The method as in claim 4, wherein the stopping the direct data stream comprises:
sending a message to stop direct data streaming; and
disconnecting the connection between the local device and the remote device based upon the message to stop direct data streaming.

6. A system comprising:
a local device comprising a local device upper layer stack; and
a remote device comprising a remote device upper layer stack;
said local device and remote device establishing a connection therebetween via respective device upper layer stacks for direct data streaming by at least exchanging connection information therebetween, said local device being configured to analyze the connection information during the exchanging, the connection information including a command and header information, establish the connection for direct data streaming by receiving a data stream, formatting the data stream into data packets, and sending the data packets directly to the remote device through a physical link without a host intervention, and wherein the data packets are sent without host intervention based upon the command and header information analyzed during the connection establishment.

7. The system of claim 6, wherein said local device comprises:
a local host for sending a message to start the direct data stream over the connection; and
a local host controller for starting the direct data stream between said local device and said remote device over the connection based upon the message to start a direct data stream.

8. The system of claim 7, wherein said local host comprises:
an application for providing a user interface to a user; and
a local host upper layer stack for sending connection information to said local host controller.

9. The system of claim 7, wherein said local host controller comprises:
a partial local host controller upper layer stack for formatting the data stream into the data packets; and
a lower layer stack for sending the data packets directly to said remote device through a the physical link without host intervention.

10. The system of claim 6, wherein said local device further comprises a data source for providing the data to be streamed between said local device and said remote device.

11. The system of claim 6, wherein said remote device comprises:
a remote host for providing a user interface for requesting a data transfer;
a remote host controller for receiving the data directly streamed from said local device; and
a remote data sink for storing the received data.

12. The system of claim 11, wherein said remote host comprises:
an application for providing the user interface to a user; and
a remote host upper layer stack for formatting data.

13. The system of claim 11, wherein said remote host controller comprises a remote host lower layer stack for receiving the directly streamed data from said local device.

14. The system of claim 6, wherein said local device comprises at least one of a mobile device, a personal digital assistant (PDA), a gaming device, and a laptop.

15. The system of claim 6, wherein said remote device comprises at least one of a Bluetooth headset, a Bluetooth joystick, and a video game console.

16. A non-transitory computer-readable medium having computer-executable instructions for configuring a connection for direct data streaming between a local device and a remote device by:
establishing a connection between an upper layer stack of the local device and an upper layer stack of the remote device by at least exchanging connection information between the local device and the remote device;
analyzing the connection information at the local device during the exchanging, the connection information including a command and header information;
sending a message over the connection; and
starting a direct data stream between the local device and the remote device over the connection based upon receiving the message by at least
receiving the data stream from a data source,
formatting the data stream into data packets, and
sending the data packets directly to the remote device through a physical link without a host intervention, and wherein the data packets are sent without host intervention based upon the command and header information analyzed by the local device during the connection establishment.

17. The non-transitory computer-readable medium as in claim 16, wherein the connection information is at least one of protocol information, a Quality of Service (QoS) parameter, and a bit rate.

* * * * *